L. WILPUTTE.
TUNNEL KILN AIR HEATER.
APPLICATION FILED NOV. 20, 1919.
1,389,408.
Patented Aug. 30, 1921.
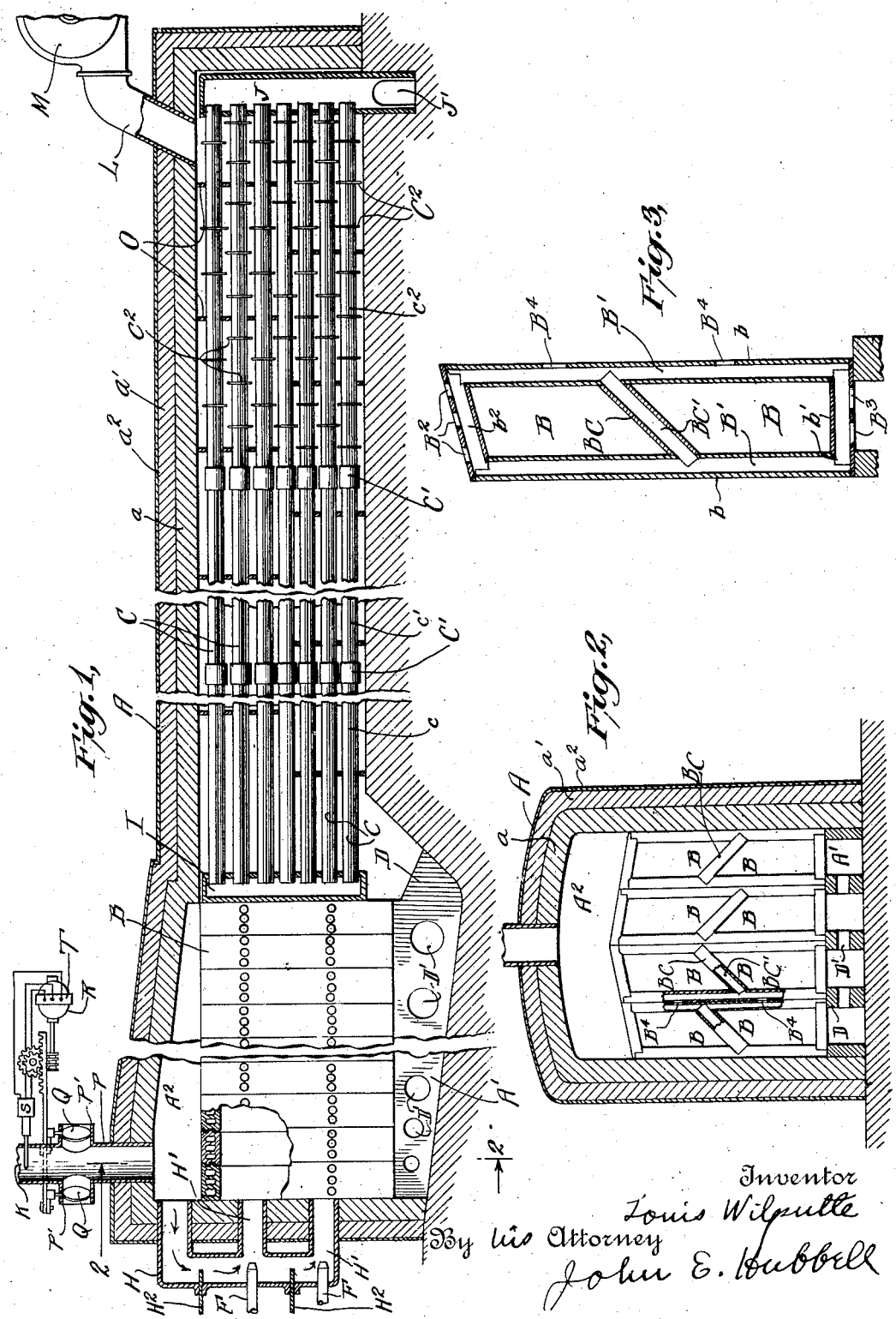
Inventor
Louis Wilputte
By his Attorney
John E. Hubbell

UNITED STATES PATENT OFFICE.

LOUIS WILPUTTE, OF NEW ROCHELLE, NEW YORK, ASSIGNOR TO AMERICAN DRESSLER TUNNEL KILNS, INC., OF NEW YORK, N. Y., A CORPORATION OF NEW YORK.

TUNNEL-KILN AIR-HEATER.

1,389,408.  Specification of Letters Patent.  Patented Aug. 30, 1921.

Application filed November 20, 1919. Serial No. 339,518.

*To all whom it may concern:*

Be it known that I, LOUIS WILPUTTE, a citizen of the United States, and a resident of New Rochelle, in the county of Westchester and State of New York, have invented certain new and useful Improvements in Tunnel-Kiln Air-Heaters, of which the following is a specification.

The general object of my present invention is to provide improved means for heating air. A more specific object of the invention is to provide efficient apparatus for generating hot air in large quantities for industrial uses, as in drying apparatus, and the like and which is capable of delivering air at relatively high temperatures when such high temperatures are desirable.

The various features of novelty which characterize my invention are pointed out with particularity in the claims annexed to and forming a part of this specification. For a better understanding of the invention, however, and its characteristic advantages, reference may be had to the accompanying drawings and descriptive matter in which I have illustrated and described a preferred embodiment of my invention.

Of the drawings:

Figure 1 is a longitudinal sectional elevation;

Fig. 2 is a partial section on the line 2—2 of Fig. 1, and

Fig. 3 is a section taken similarly to Fig. 2 but on a larger scale and showing a portion only of the apparatus shown in Fig. 2.

The apparatus shown in Fig. 1 comprises a refractory and heat insulated housing A containing a horizontally elongated chamber in which are located a plurality of combustion chambers B and a group of tubes C forming extensions of the combustion chambers. In the preferred construction illustrated the housing A comprises an inner wall $a$ of refractory masonry, a covering $a'$ of kieselguhr for the masonry and an air tight metallic casing $a^2$.

The combustion chambers B are of the general character employed for example in the well-known Dressler tunnel kilns. The walls of these combustion chambers are formed of straight hollow tile made of fire clay or other refractory material, and having longitudinal open ended air circulating passages B' formed in them as is usual in the combustion chambers of Dressler kilns.

As shown, see Fig. 2, the combustion chambers are formed in four vertical sections arranged side by side. Each section, as seen best in Fig. 3, is formed of two vertical side walls $b$, a horizontal bottom wall $b'$ and a top wall $b^2$ which is inclined slightly to the horizontal. The top wall $b^2$ is shown as formed with distributed discharge orifices $B^2$ and the bottom wall $b'$ with inlet orifices $B^3$. On account of the very considerable vertical height which I preferably give to these vertical sections, I advantageously form two combustion chambers B in each section by means of a partition which runs longitudinally of the combustion chambers between the side walls $b$ of the combustion chamber wall sections. As shown, two combustion chambers are formed in each section by a single partition. Advantageously, though not necessarily, I form the partition walls BC of hollow tile similar to the other combustion chamber walls and with the channels BC' therein opening at their ends into the channels B' of the corresponding walls $b$. In this case each partition BC should have its channels BC' slightly inclined to the horizontal. The combustion chambers are shown as mounted upon longitudinal masonry ribs or beam like supports D located on the bottom wall of the chamber A and formed with equalizing ports D'. In some cases equalizing ports $B^4$ may be formed as shown to connect the channels B' adjacent vertical wall sections $b$.

The combustion chambers may be heated by the ignition of fuel therein, or by passing the burning products of combustion of an external furnace into the ends of the combustion chamber remote from the tubes C. Preferably, as shown, the combustion chambers are heated by the combustion therein of combustible fluid fuel supplied by oil or gas burner nozzles F of which there are one for each combustion chamber proper. The air uniting with the gas in combustion is shown as supplied through piping H receiving hot air from the interior of the housing A and having a branch H' discharging into each combustion chamber. The supply of air may be regulated as by means of dampers $H^2$. At their ends remote from the burners the combustion chambers B discharge into a header or headers I into which are connected the adjacent ends of the tubes C. The opposite ends of the tubes C are connected into a header J and the products of combustion pass out from the latter through the outlet J' to a stack or exhaust fan not shown. To take care of relative expansion of the housing wall and the tubes C, the latter are advantageously connected into one or both of the headers I and J by slip joints.

As shown, the tubes C are formed in three sections, $c$, $c'$ and $c^2$ connected by couplings C'. These sections are especially proportioned, or formed of special materials to give a desirably large coefficient of heat transfer through their walls while at the same time insuring substantial durability under the operating conditions to which they are subjected. For example, the sections $c$ may be made of cast iron, the sections $c'$ of wrought iron, and the sections $c^2$ of copper or brass. To increase their heat transferring effectiveness some or all of the tube sections may be provided with external ribs or projections $C^2$.

The air to be heated is passed to the interior of the housing A through an air inlet L which may advantageously be connected to the outlet from a fan or blower M. Baffles O compel the air to follow a zig-zag course back and forth across the tubes C in passing from the air inlet L to the opposite end of the housing A in which the combustion chambers are located. Above and below the combustion chambers B the housing A is vertically enlarged to provide supply and discharge spaces A' and A² respectively for the air passing through the ventilating channels B' and BC' in the hollow walls of the combustion chamber. Advantageously, as shown, space A' decreases, and the space A² increases in vertical depth from the header I to the adjacent end wall of the housing. This tapering of the supply and discharge spaces contributes to a desirable uniformity of distribution of the ascending air currents among the various ventilating channels in the walls of the combustion chambers.

The heated air collecting in the space A² passes from the latter partly to the burners through the piping H but mainly to the place of use through the discharge pipe P. It will often be the case, that air is required at a temperature below that at which the air is most efficiently delivered from the space A² through the outlet K. In such case the temperature of the air may advantageously be reduced by adding cold air to the high temperature air thus obtaining an increased volume of heated air of the desired temperature. This result may be secured and a mixture of constant temperature secured by the arrangement shown. This arrangement comprises ports P' through which atmospheric air may enter the hot air outlet pipe P, rotatable dampers Q for throttling the ports P more or less, a reversible electric motor R for adjusting the dampers Q, and a thermostat S responsive to the temperature in the pipe P beyond the ports P' and operatively connected to an automatic controller T for the motor R.

In the normal operation of the apparatus shown hot air supplied by the piping H and fuel supplied by the burner nozzles F unite in combustion in the combustion chambers B and the products of combustion pass from the chambers B into the header I and from the latter through the tubes C and thence through the header J and outlet J' to the exterior of the apparatus. The air to be heated entering the housing A at L and flowing along the tubes C in a general direction counter to that in which the products of combustion flow is progressively heated and the products of combustion correspondingly cooled as the air passes to the space A' below the combustion chambers B. As the air passes upward to the space A² above the combustion chambers it absorbs relatively large amounts of heat from the combustion chambers. The chimney suction effects of the different channels in the walls of the combustion chambers vary with the temperature therein and thus tend to create the distribution of the ascending air currents among these channels necessary to maintain uniform temperature conditions in the walls of the combustion chambers.

With the construction described it is possible to so cool the products of combustion as to substantially minimize the sensible heat carried out of the apparataus by these products while keeping the cost and bulk of the apparatus relatively small. The relatively high temperature to which it is readily feasible to heat the air in its passage through the combustion chamber wall channels adds to the thermal efficiency of the apparatus.

While in accordance with the provisions of the statutes, I have illustrated and described the best embodiments of my invention now known to me, it will be apparent to those skilled in the art that changes may be made in the form of the apparatus disclosed without departing from the spirit of my invention as set forth in the appended claims and that certain features of my invention may sometimes be used with advantage without a corresponding use of other features.

Having now described my invention, what I claim as new, and desire to secure by Letters Patent, is:

1. Air heating means comprising in combination, a structure built of refractory material and formed with a plurality of parallel combustion chambers and channels extending transversely to said chambers, a group of spaced apart pipes connected to and forming extensions of the combustion chambers, a housing inclosing said structure and pipes and closely surrounding the group of pipes but shaped to form a passage at one side of said structure which is in communication with the inter-pipe space, and a second passage at the opposite side of said structure out of direct communication with said inter-pipe space but connected to the other passage by said channels, said housing being formed with an air inlet at its end remote from said structure and an air outlet leading from said second passage, and means for supplying fuel and air to said combustion chambers.

2. Air heating means comprising in combination, a structure of refractory material and formed with a plurality of parallel combustion chambers and channels extending transversely to said chambers, a group of spaced apart pipes connected to and forming extensions of the combustion chambers, a housing inclosing said structure and pipes and closely surrounding the group of pipes, but shaped to form a passage at one side of said structure which is in communication with the inter-pipe space, and a second passage at the opposite side of said structure out of direct communication with said inter-pipe space, but connected to the other passage by said channels, said housing being formed with an air inlet at its end remote from said structure and an air outlet leading from said second passage, means for supplying fuel and air drawn from said second passage to said combustion chambers.

3. Air heating means comprising in combination, a structure built of refractory material and formed with a plurality of parallel combustion chambers and channels extending transversely to said chambers, a group of spaced-apart pipes connected to and forming extensions of the combustion chambers, a housing inclosing said structure and pipes and closely surrounding the group of pipes, but shaped to form a passage at one side of said structure which is in communication with the inter-pipe space, and a second passage at the opposite side of said structure out of direct communication with said inter-pipe space, but connected to the other passage by said channels, said housing being formed with an air inlet at its end remote from said structure and an air outlet leading from said second passage, and means for supplying fuel and air to said combustion chambers, said pipes being formed of sections with the sections more remote from the combustion chambers of greater heat conductivity than those less remote.

4. Air heating means comprising in combination, a combustion chamber structure formed with a plurality of parallel combustion chambers the walls of which are made of tile provided with open-ended channels transverse to the combustion chambers, a group of spaced apart pipes connected to and forming extensions of said combustion chambers and a housing provided with an air inlet and air outlet which incloses said pipes and structure, said housing, pipes and tile being so relatively arranged that air passing from said inlet to said outlet first passes through the inter-pipe space and then through said tile channels.

5. Air heating means comprising in combination, a combustion chamber structure formed with a plurality of parallel horizontal combustion chambers the walls of which are formed of tile provided with open-ended channels transverse to the combustion chambers, said channels uniting to form a network of vertical and inclined passages leading from the under to the upper side of said structure, a group of spaced apart horizontal pipes connected to and forming an extension of said combustion chambers, a housing provided with an air inlet and outlet which incloses said pipes and structure, said housing pipes and tile being so relatively arranged that air passing from said air inlet to said outlet first passes through the inter-pipe space and then upward through the network passages in said structure, and means for supplying fuel and air to said combustion chambers.

Signed at New York, in the county of New York and State of New York this seventeenth day of November, A. D. 1919.

LOUIS WILPUTTE.